/

US008694252B2

(12) United States Patent
Hu et al.

(10) Patent No.: US 8,694,252 B2
(45) Date of Patent: Apr. 8, 2014

(54) PERSONAL NAVIGATION DEVICE WHICH PROVIDES PORTABLE ELECTRONIC MAP AND RELATED NAVIGATING METHOD

(75) Inventors: Wei-Han Hu, Taipei County (TW); Yao-Tsung Yeh, Taipei County (TW)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 404 days.

(21) Appl. No.: 13/011,930

(22) Filed: Jan. 24, 2011

(65) Prior Publication Data

US 2011/0301836 A1 Dec. 8, 2011

(30) Foreign Application Priority Data

Jun. 2, 2010 (TW) .............................. 099117761 A
Jul. 21, 2010 (TW) .............................. 099123940 A

(51) Int. Cl.
G01C 21/26 (2006.01)
(52) U.S. Cl.
USPC ...... 701/516; 701/526; 701/483; 340/995.26; 340/995.24
(58) Field of Classification Search
USPC ......... 701/408–410, 454, 483, 487, 491, 526, 701/538, 540, 541; 340/995.11–16, 18, 24, 340/26, 27
See application file for complete search history.

(56) References Cited

U.S. PATENT DOCUMENTS

| | | | |
|---|---|---|---|
| 5,781,155 A * | 7/1998 | Woo et al. ................. | 342/357.57 |
| 5,819,227 A * | 10/1998 | Obuchi ......................... | 701/117 |
| 5,917,435 A * | 6/1999 | Kamiya et al. ........... | 340/995.26 |
| 6,125,326 A | 9/2000 | Ohmura | |
| 6,182,006 B1 * | 1/2001 | Meek .............................. | 701/538 |
| 6,336,074 B1 * | 1/2002 | Woo ............................... | 701/431 |
| 6,427,115 B1 | 7/2002 | Sekiyama | |
| 6,505,121 B1 * | 1/2003 | Russell ......................... | 701/431 |
| 6,587,891 B1 * | 7/2003 | Janky et al. ....................... | 710/1 |
| 6,681,176 B2 * | 1/2004 | Funk et al. ..................... | 701/433 |
| 6,741,934 B2 | 5/2004 | Chen | |
| 7,113,110 B2 * | 9/2006 | Horstemeyer ................ | 340/994 |
| 7,444,238 B1 * | 10/2008 | Opitz ............................. | 701/454 |
| 7,519,470 B2 * | 4/2009 | Brasche et al. ................ | 701/457 |
| 7,583,204 B2 * | 9/2009 | McCarthy et al. ............ | 340/988 |
| 8,185,267 B2 * | 5/2012 | Nezu et al. ...................... | 701/36 |
| 8,265,862 B1 * | 9/2012 | Zilka ............................. | 340/988 |
| 2002/0152027 A1 * | 10/2002 | Allen ............................. | 701/213 |
| 2004/0254722 A1 * | 12/2004 | Spencer et al. ............... | 701/208 |
| 2006/0238384 A1 * | 10/2006 | Hess et al. ................. | 340/995.14 |
| 2007/0176797 A1 * | 8/2007 | Rhodes et al. ........... | 340/995.15 |
| 2007/0203641 A1 * | 8/2007 | Diaz et al. ..................... | 701/208 |
| 2008/0158019 A1 * | 7/2008 | Takimoto et al. ........ | 340/995.26 |
| 2008/0298083 A1 * | 12/2008 | Watson et al. ................ | 362/603 |

(Continued)

FOREIGN PATENT DOCUMENTS

| | | |
|---|---|---|
| GB | 2417048 A | 2/2006 |
| JP | 972750 | 3/1997 |

(Continued)

*Primary Examiner* — Helal A Algahaim
*Assistant Examiner* — Donald J Wallace
(74) *Attorney, Agent, or Firm* — Winston Hsu; Scott Margo

(57) ABSTRACT

A personal navigation device includes a navigation console and a peripheral device. The navigation console is configured to acquire a navigation instruction from a start point to a destination and a detailed map which depicts a predetermined area around the destination. The peripheral device is connected to the navigation console in a detachable manner for displaying the detailed map.

12 Claims, 10 Drawing Sheets

(56) References Cited

U.S. PATENT DOCUMENTS

2009/0058683 A1* 3/2009 Becker .......................... 340/989
2009/0058685 A1* 3/2009 McCall et al. ............ 340/995.24
2010/0056340 A1* 3/2010 Ellis et al. ........................ 482/4

FOREIGN PATENT DOCUMENTS

| TW | 432833 | 5/2001 |
| TW | 535959 | 6/2003 |
| TW | M247835 | 10/2004 |

* cited by examiner

PERSONAL NAVIGATION DEVICE WHICH PROVIDES PORTABLE ELECTRONIC MAP AND RELATED NAVIGATING METHOD

BACKGROUND OF THE INVENTION

1. Field of the Invention

The present invention is related to a personal navigation device and related navigating method, and more particularly, to a personal navigation device which provides portable electronic map and related navigating method.

2. Description of the Prior Art

GPS (Global Positioning System) is a space-based global navigation satellite system which provides reliable location and time information in all weather, at all times, and almost anywhere on or near the Earth. GPS-based personal navigation devices are well known and widely employed as in-car navigation devices. Common functions of a personal navigation device include providing a map database for generating navigation instructions which are then shown on a display of the personal navigation device. In order to enable a user to navigate to a pre-defined destination from a start point, a personal navigation device may have an internal system (such as a GPS receiver) for receiving location data, or may merely be connectable to a receiver which can receive location data. The personal navigation device may compute a route itself, or communicate with a remote server which is configured to compute the route and provides navigation information to the personal navigation device, or a hybrid device in which the personal navigation device itself and a remote server both play a role in the route computation process. These personal navigation devices are often mounted on or in the dashboard of a vehicle using a suction mount or other mounting means, and may thus readily be dismounted. Generally (but not necessarily), personal navigation devices are fully self-contained, such as including an internal GPS antenna, navigation software and map database, and can hence plot and display a route to be taken.

FIG. 1 is a functional block diagram illustrating a prior art personal navigation device 100. The personal navigation device 100 includes a receiver module 14, a memory 15, processor 16, a user interface 17, and a display module 18. The receiver module 14 is configured to receive a location signal, based on which the processor 16 may calculate the current coordinate of the personal navigation device 100. The processor 16 is configured to control the operation of the personal navigation device 100. A map database and a route-planning software are stored in the memory 15. After the user selects or inputs the information about a destination via the user interface 17, the processor 16 may execute the route-planning software so as to acquire all possible routes from the map database according to the current coordinate of the personal navigation device 100 and the coordinate of the destination. Among all possible routes, the best route may be displayed on the display module 18 for providing navigation instructions.

FIG. 2 is a diagram illustrating a prior art navigation method. The user may be navigated to a destination B from a start point A according to the suggested route provided by the personal navigation device 100 (represented by the arrow in FIG. 2). If the destination B does not provide parking facility, the user may need to park the vehicle in nearby parking lots C1-C3. If new to the neighborhood, the user may have trouble finding the right way to the destination B from the actual parking location. Uncertain about the final parking location, a new navigation instruction from the actual parking location to the destination B can only be acquired after the user actually finds an available parking lot. After parking the vehicle, the user needs to dismount the personal navigation device 100 and carry it at hand for consulting the new navigation instruction, and then re-mount the personal navigation device 100 to the vehicle on the way back, which causes inconveniences. If the user memorizes the new navigation instruction, the risk of getting lost still exists due to false memory. On the other hand, although thin regional maps are easy to carry, taking the trouble to get the regional maps of every unfamiliar region to be visited is not customary. A comprehensive atlas which contains detailed information of all possible destinations is too bulky to carry at hand, and is normally placed in the vehicle for reference.

SUMMARY OF THE INVENTION

The present invention provides a personal navigation device which provides a portable electronic map and includes a navigation console and a peripheral device. The navigation console includes a receiver module for receiving a location signal associated with a current location of the personal navigation device; a processor configured to provide a navigation instruction according to the location signal and a destination inputted by a user and configured to acquire a detailed map which depicts a predetermined area around the destination after receiving a print command; and a display module for displaying the navigation instruction. The peripheral device is connected to the navigation console in a detachable manner and includes a connecting module; and a screen for displaying the detailed map without external power supply when the peripheral device is detached from the navigation console.

The present invention further provides navigation method which provides a portable electronic map. The navigation method includes providing a navigation instruction on a navigation console of a personal navigation device according to coordinates of a start point and a destination; after entering a predetermined area around the destination, downloading a detailed map related to the predetermined area to a peripheral device of the personal navigation device which is connected to the navigation console in a detachable manner; and after arriving at a predetermined location in the predetermined area, providing the peripheral device as the portable electronic map by removing the peripheral device from the navigation console.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
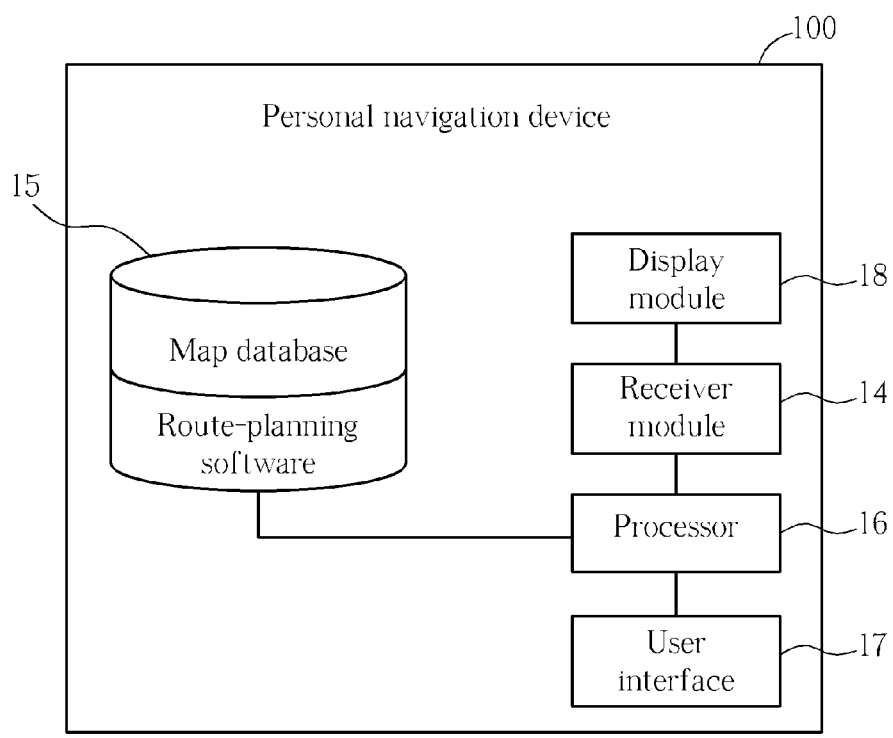
FIG. 1 is a functional block diagram illustrating a prior art personal navigation device.
Figure 2:
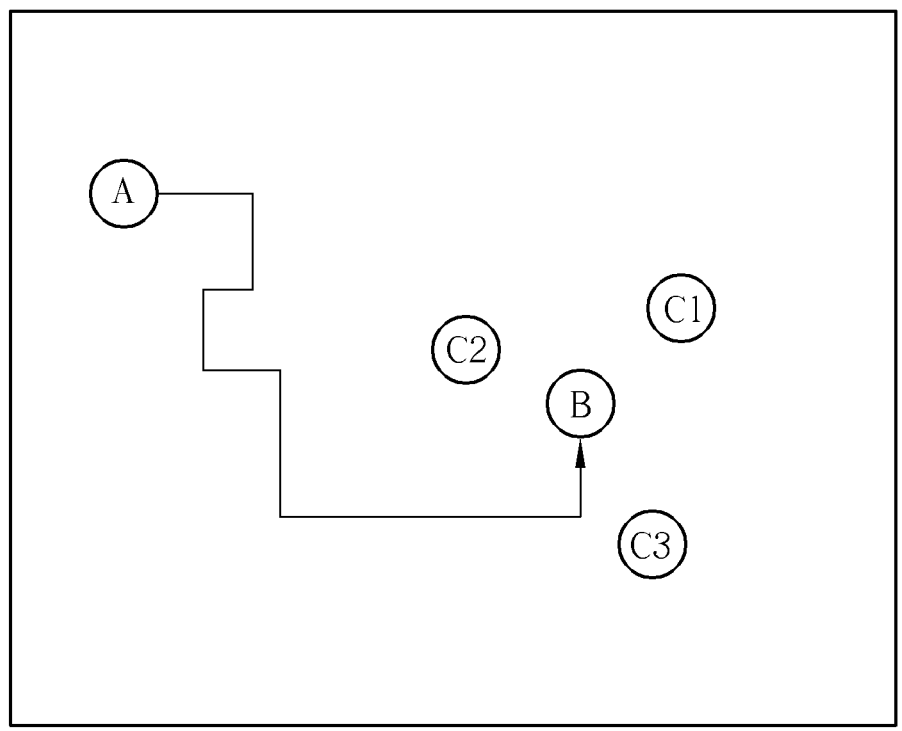
FIG. 2 is a diagram illustrating a prior art navigation method.
Figure 3:
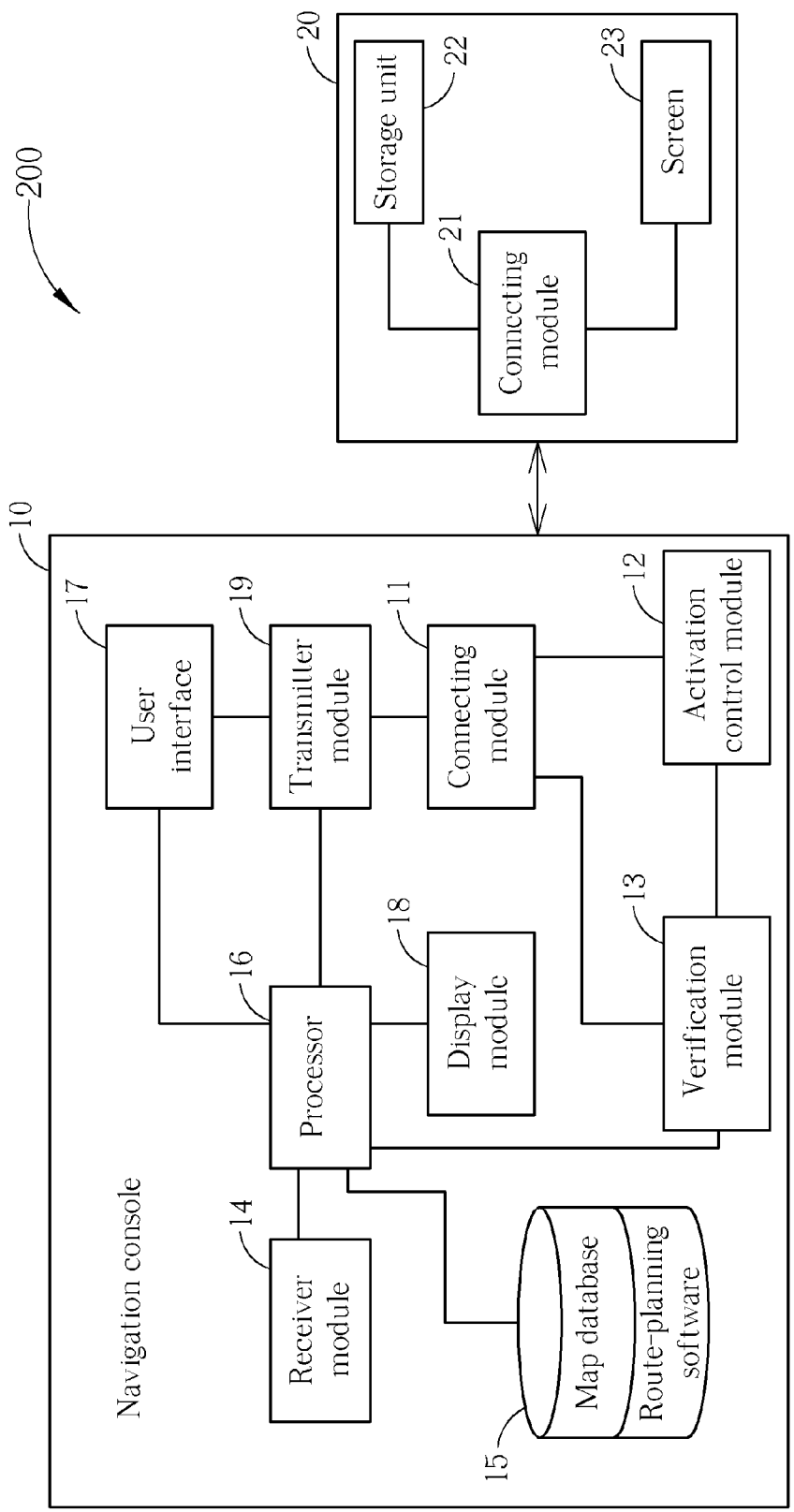
FIG. 3 is a functional block diagram illustrating a personal navigation device according to the present invention.

FIG. 3 is a functional block diagram illustrating a personal navigation device 200 according to the present invention. The personal navigation device 200 includes a navigation console 10 and a peripheral device 20. The navigation console 10 is configured to handle the overall navigation process. The peripheral device 20 may be connected to the personal navigation console 10 in a detachable manner: when the peripheral device 20 is attached to the navigation console 10, the navigation console 10 is allowed to performed navigation and the peripheral device 20 is allowed to receive data from the navigation console 10; when the peripheral device 20 is detached from the navigation console 10, the navigation console 10 is deactivated while the peripheral device 20 may retain and display data without external power supply, such as batteries.

In one embodiment of the present invention, the peripheral device 20 may also serve as a smart key of a vehicle where the personal navigation device 200 is installed. The peripheral device allows the user to perform keyless operations such as unlocking, locking and starting the vehicle without making physical contact. The peripheral device may be identified via one of several antennas in the vehicle's bodywork and a radio pulse generator in the housing of the peripheral device.

The navigation console 10 includes a connecting module 11, an activation control module 12, a verification module 13, a receiver module 14, a memory 15, processor 16, a user interface 17, a display module 18, and a transmitter module 19. The peripheral device 20 includes a connecting module 21, a storage unit 22, and a screen 23. When the peripheral device 20 is attached to the navigation console 10, the respective connecting modules 11 and 21 are electrically connected to each other, thereby allowing data transmission therebetween.

When a user turns on the personal navigation device 200, the activation control module 12 is configured to disable all other modules in the navigation console 10 if detecting that the connecting modules 11 and 21 are not electrically connected to each other. If the activation control module 12 detects that the connecting modules 11 and 21 are electrically connected to each other, the verification module 13 may proceed to access a chip code stored in the storage unit 22 of the peripheral device 20 and verify the accessed chip code with a built-in identification code of the navigation console 10. If the accessed chip code matches the built-in identification code, all other modules of the navigation console 10 may be activated subsequently. In other words, the personal navigation device 200 only functions when the corresponding peripheral device 20 is attached to the navigation console 10.

After confirming that the peripheral device 20 is attached to the navigation console 10, the receiver module 14 is configured to receive a location signal, based on which the processor 16 may calculate the current coordinate of the personal navigation device 200. A map database and a route-planning software are stored in the memory 15. After the user selects or inputs the information about a destination via the user interface 17, the processor 16 may execute the route-planning software so as to acquire all possible routes from the map database according to the current coordinate of the personal navigation device 200 and the coordinate of the destination. Among all possible routes, the best route may be displayed on the display module 18 for providing navigation instruction. The personal navigation device 200 may update the displayed navigation instruction based on its current coordinate which changes as the user heads for the destination or other locations.

In the embodiment illustrated in FIG. 3, the map database is stored in the memory 15; in other embodiments of the present invention, the map database may be acquired from the Internet, such as provided by Google map.

In the embodiment illustrated in FIG. 3, the receiver module 14 is configured to receive a location signal provided by GPS; in other embodiments of the present invention, the location signal may be provided by Galileo satellite system or other positioning systems.

In one embodiment of the present invention, the user interface 17 and the display module 18 may be provided by a touch panel; in other embodiment of the present invention, the user interface 17 and the display module 18 may be separate devices, such as a control button and a liquid crystal display.

Figure 4:
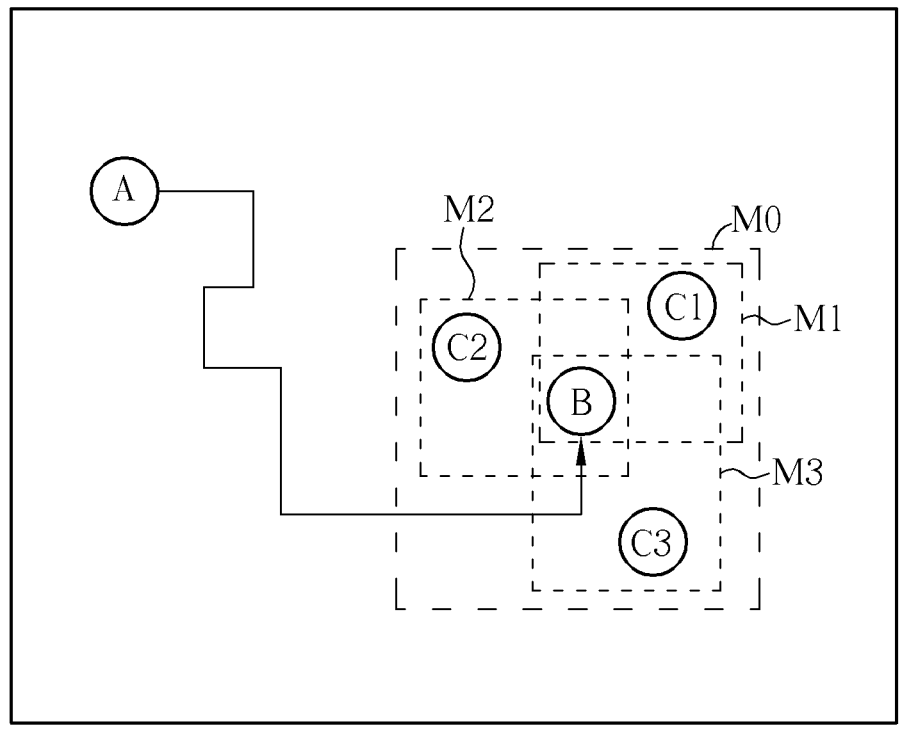
FIG. 4 is a diagram illustrating a navigation method according to the present invention.

FIG. 4 is a diagram illustrating a navigation method according to the present invention. The user may head for a destination B from a start point A according to the suggested route provided by the personal navigation device 200 (represented by the arrow in FIG. 4). Meanwhile, detailed maps M0-M3 which depict areas covering the actual parking location and the destination B are also provided and stored in the navigation console 10. In one embodiment of the present invention, the user may issue a "PRINT" command via the user interface 17 after entering a predetermined area around the destination B, so that the personal navigation device 200 may acquire a detailed map (such as M0) which depicts the predetermined area around the destination B from the map database; in another embodiment of the present invention, the user may issue a "PRINT" command via the user interface 17 after parking the vehicle, so that the personal navigation device 200 may acquire a corresponding detailed map (such as M1, M2, or M3) from the map database according to the current coordinate of the personal navigation device 200 (such as C1, C2, or C3) and the coordinate of the destination B, or acquire a corresponding detailed map (such as M1, M2, or M3) which depicts a predetermined area around the current coordinate of the personal navigation device 200 (such as C1, C2, or C3). After receiving the "PRINT" command, the personal navigation device 200 then stores the accessed detailed map into the peripheral device 20.

After parking the vehicle, the user may easily remove the peripheral device 20 from the navigation console 10 and carry the peripheral device 20 with him. On the way to the destination B, the user may refer to the detailed map stored in the peripheral device 20 for instruction, thereby avoiding getting lost in an unfamiliar neighborhood. The navigation instruction may be presented in various ways, such as by depicting a guidance symbol which is positioned either on the map or beside the map. Meanwhile, the peripheral device 20 may also store information related to a point of interest (POI), such as the location of the convenience store, bank or bakery near the destination B. The user may run some errands before getting to the destination B for an appointment, such as paying bills in the convenience store, transferring money in the bank, or purchasing breakfast in the bakery.

In one embodiment of the present invention, the peripheral device 20 may be fabricated using E-paper technology. Compared to traditional paper using carbon fiber material, E-paper consists of a high molecule conductive material which includes many microcapsules. Each microcapsule, consisting of electrophoretic liquid and dyed janus particles, forms electronic link whose size corresponds to the pixel size of the display. When a negative voltage is applied on top of a microcapsule, the transparent Janus particles carrying positive charging agent move upwards and the dark or dyed janus particles carrying negative charging agent move downwards in the microcapsule. thereby presenting white color under such circumstance; when a positive voltage is applied on top of the microcapsule, the transparent janus particles carrying positive charging agent move downwards and the dark or dyed janus particles carrying negative charging agent move downwards in the microcapsule, thereby presenting black or the color of the dyed janus particles. E-paper is characterized in thin appearance, bi-stable operational state and low power consumption which only takes place when refreshing images. Therefore, the peripheral device 20 using E-paper may store the detailed map for a much longer period than the time it takes for the user to get to the destination B from the parking lot. Also, peripheral device 20 can be carried at hand easily without causing much burden.

Figure 5:
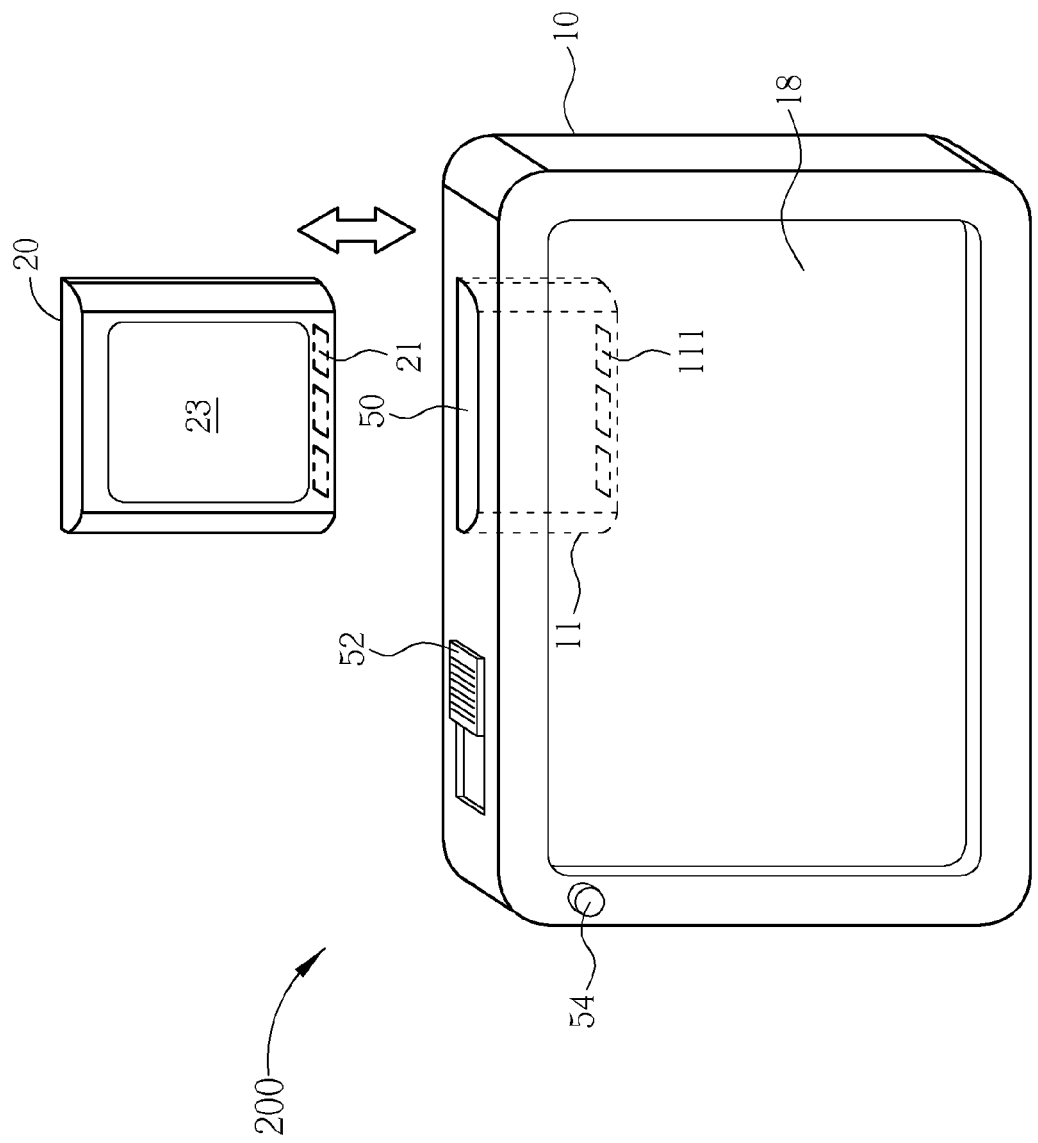
FIGS. 5-10 are diagrams illustrating embodiments of the personal navigation device according to the present invention.

In the present invention, the peripheral device 20 may be disposed in many ways so that the peripheral device 20 may be connected to the navigation console 10 in a detachable manner. Therefore, the user may easily remove the peripheral device 20 from the navigation console after downloading the detailed map instead of dismounting the entire personal navigation device 200. FIG. 5 is a diagram illustrating the personal navigation device 200 according to a first embodiment of the present invention. FIG. 5 depicts the exterior of the personal navigation device 200. The display module 18 may be an LCD panel with touch function, thereby capable of providing the user interface 17. The user interface 17 further includes a power button 52, with which the user may turn on/off the personal navigation device 200, and a print button 54, with which the user may issue "PRINT" command. The personal navigation device 200 in FIG. 5 adopts a sliding design in which the connecting module 11 includes a slot 50 and a plurality of metal domes 111, while the connecting module 21 includes a plurality of metal pins. When the user inserts the peripheral device 20 into the slot 50 until the metal pins of the connecting module 21 are in contact with corresponding metal dome 111, the activation control module 12 may be informed that the peripheral device 20 has been properly attached to the navigation console 10. The activation control module 12, the verification module 13, the receiver module 14, the memory 15, the processor 16, and the transmitter module 19 depicted in FIG. 3 are disposed within the housing of the navigation console 10 and are therefore not shown in FIG. 5. After following the navigation instruction to the neighborhood around the destination B and having parked the vehicle in a nearby parking lot, the user may press the print button 54 for downloading the detailed map which depicts the neighborhood around the destination B (such as M0-M3 in FIG. 4) into the peripheral device 20 before removing the peripheral device 20 from the navigation console 10.

Figure 6:
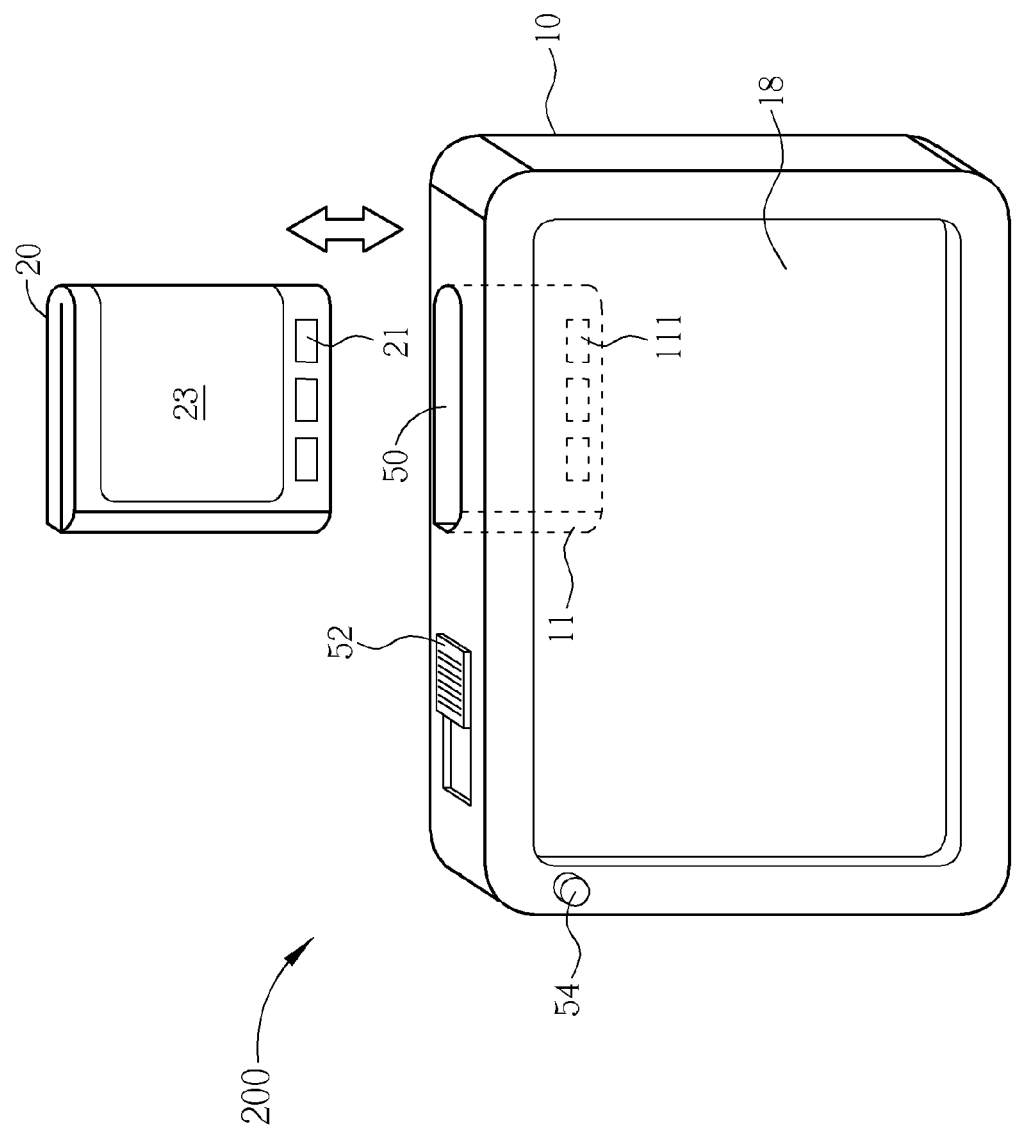

FIG. 6 is a diagram illustrating the personal navigation device 200 according to a second embodiment of the present invention. Having similar structure as the first embodiment, the peripheral device 20 in the personal navigation device 200 according to the second embodiment of the present invention is a flexible E-paper in which the electrophoretic devices are fabricated on flexible plastic substrate. With the ability to be bended repeatedly, the flexible peripheral device 20 resembles traditional paper more and can provide larger viewing area under the same constraint for the housing of the personal navigation device 200.

Figure 7:
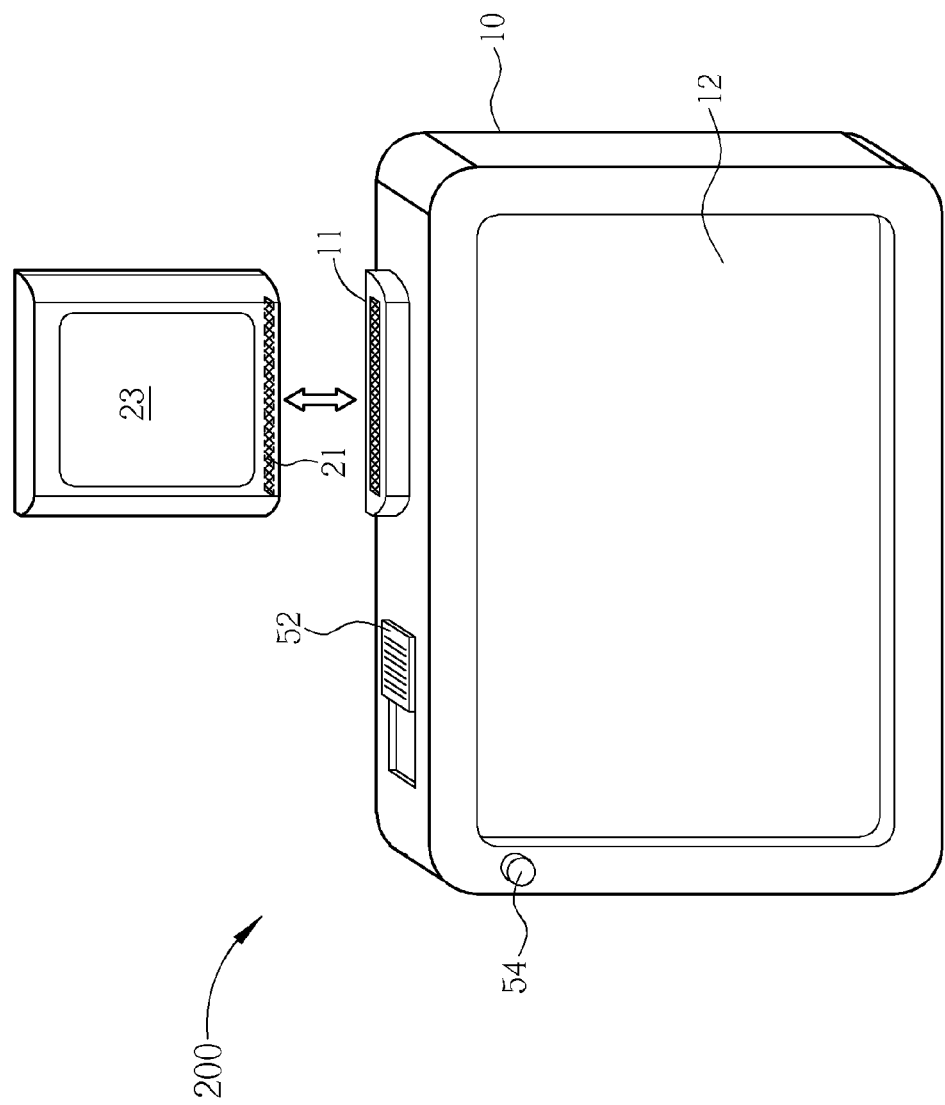

FIG. 7 is a diagram illustrating the personal navigation device 200 according to a third embodiment of the present invention. Having similar structure as the first embodiment, the connecting device 11 according to the third embodiment of the present invention is a socket disposed on the surface of the navigation console 10 and the connecting device 21 includes corresponding contact pins. When the user attaches the peripheral device 20 to the navigation console 10, the socket of the connecting device 11, now in contact with the contact pins of the connecting device 21, may hold the peripheral device 20. The activation control module 12 may be informed that the peripheral device 20 has been properly attached to the navigation console 10.

Figure 8:
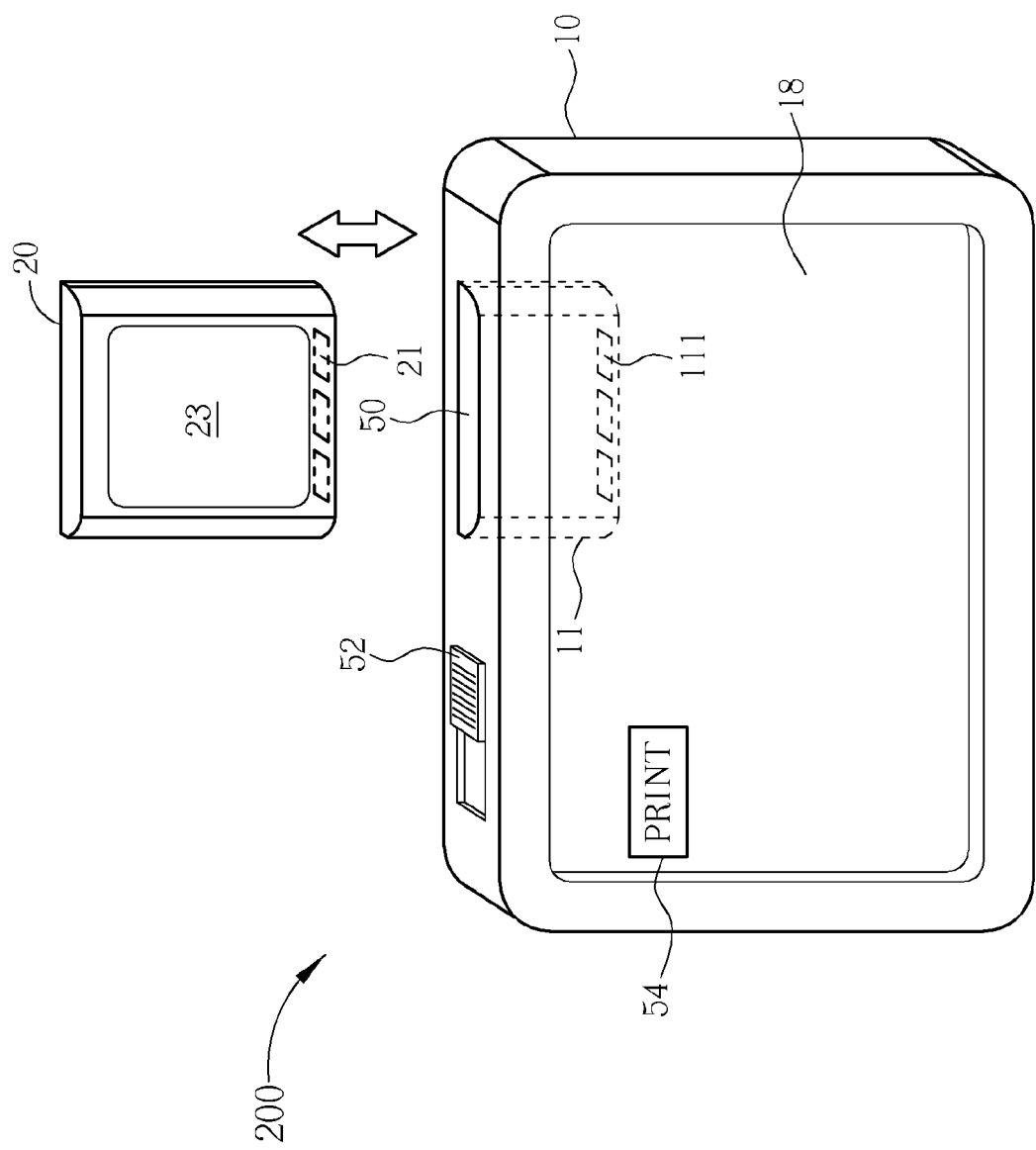
Figure 9:
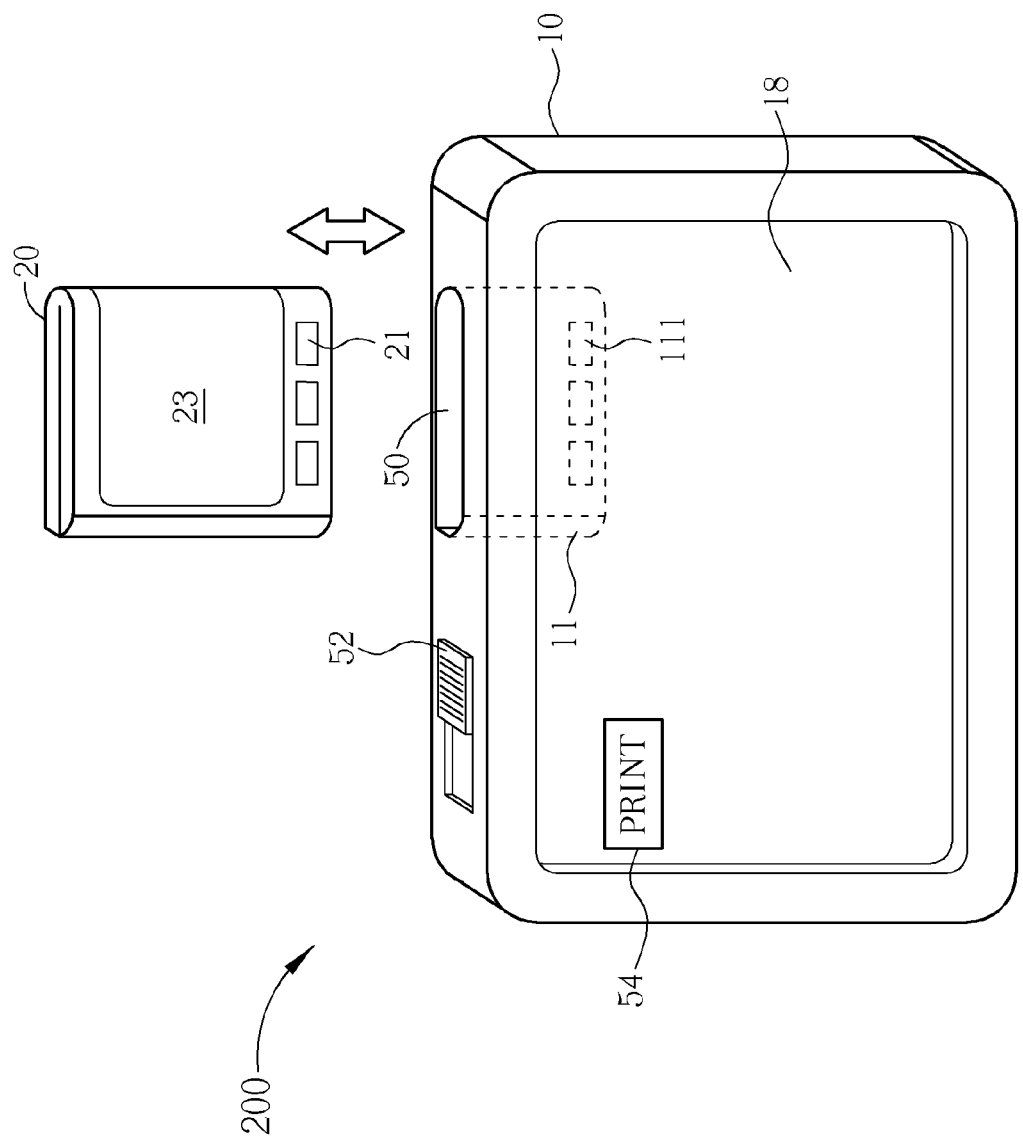
Figure 10:
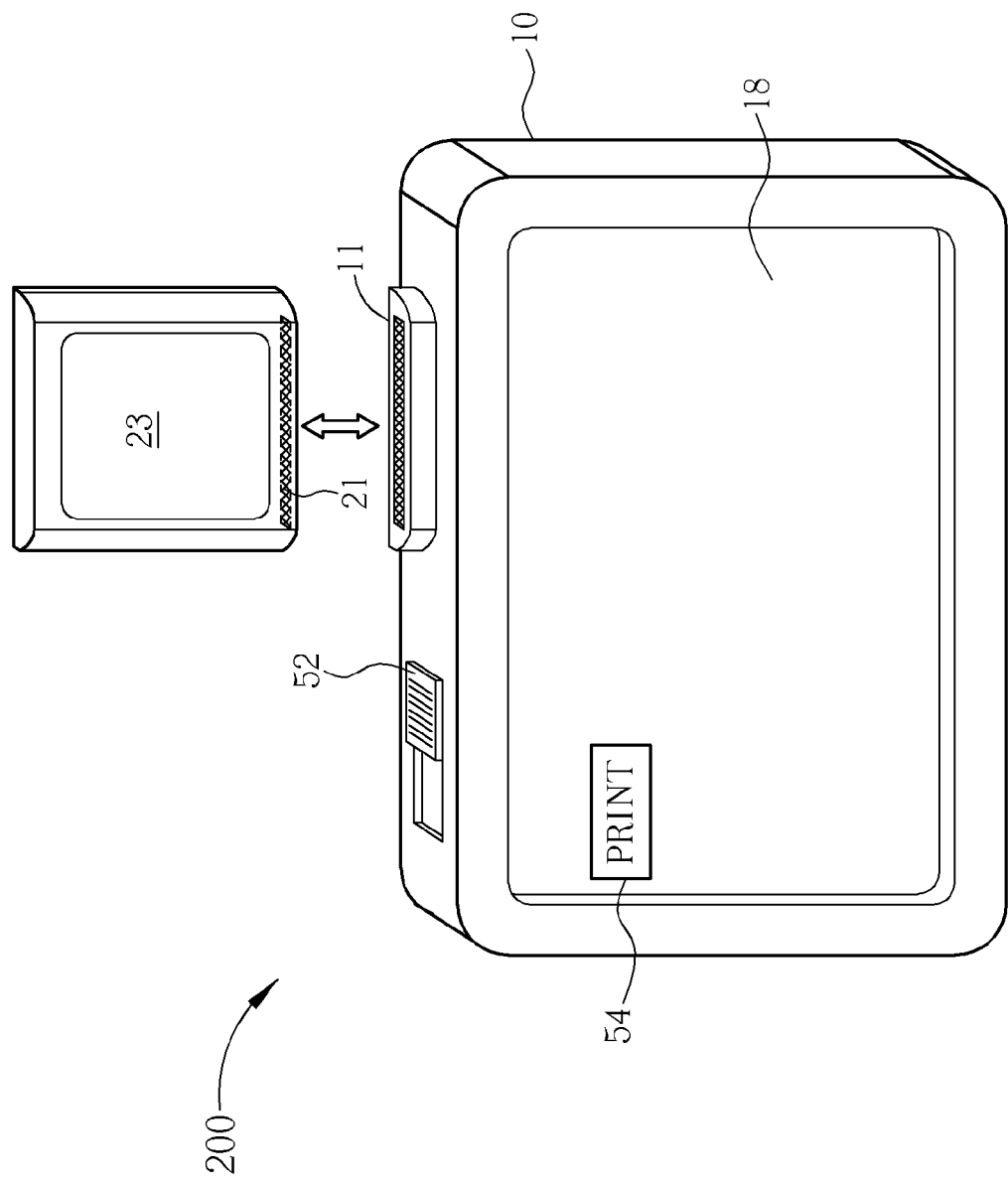

FIGS. 8-10 are diagrams illustrating the personal navigation device 200 according to fourth to sixth embodiments of the present invention. In the first to third embodiments, the print button 54 is disposed externally on the housing of the navigation console 10, and the user may issue a "PRINT" command by pressing the print button 54. In the fourth to sixth embodiments, the print button 54 is presented as the software icons on the display module 18 with touch function, and the user may issue a "PRINT" command by touching the software print button 54 with a finger of a touch pen.

The peripheral device 20 the present invention may adopt flexible materials, have various appearances, and may be disposed in many ways. The embodiments depicted in FIGS. 5-10 are merely for illustrative purpose, and do not limit the scope of the present invention. If for some reason the direct route from the start point to the destination is not taken and the user needs further navigation from somewhere near the destination to the destination, the personal navigation device 200 of the present invention may provide portable electronic maps stored in the peripheral device 20 which can easily be carried at hand. Meanwhile, the present invention also provides information related to POIs near the destination so that the user may arrange his itinerary flexibly. Also, the present invention may provide anti-theft function which disables the personal navigation device 200 when the peripheral device 20 removed, thereby preventing unauthorized use in situations such as car break-in.

Those skilled in the art will readily observe that numerous modifications and alterations of the device and method may be made while retaining the teachings of the invention.

What is claimed is:

1. A personal navigation device which provides a portable electronic map, comprising:
   a navigation console comprising:
      a verification module;
      a receiver module for receiving a location signal associated with a current location of the personal navigation device;
      a processor configured to provide a navigation instruction according to the location signal and a destination inputted by a user and configured to acquire a detailed map which depicts a predetermined area around the destination after receiving a print command; and
      a display module for displaying the navigation instruction; and
   a peripheral device connected to the navigation console and comprising:
      a storage unit for storing a chip code;
      a connecting module; and
      a screen for displaying the detailed map without external power supply when the peripheral device is disconnected from the navigation console;
         wherein the verification module is configured to access the chip code when the peripheral device is attached to the navigation console, verify the accessed chip code with a built-in identification code of the navigation console, and allow the navigation console to be enabled if the accessed chip code matches the built-in identification code.

2. The personal navigation device of claim 1, wherein the connecting module of the navigation console comprises:
   a socket disposed on a surface of the navigation console for holding the peripheral device.

3. The personal navigation device of claim 1, further comprising:
a control button disposed on a surface of the navigation console for issuing the print command.

4. The personal navigation device of claim 3, wherein the control button is presented as a software icon shown on the display module.

5. The personal navigation device of claim 1, wherein the peripheral device is configured to communicate with the navigation console.

6. The personal navigation device of claim 1, wherein the navigation console further comprises an activation control module configured to detect whether the peripheral device is attached to the navigation console and disable the navigation console when detecting that the peripheral device is not attached to the navigation console.

7. The personal navigation device of claim 6, wherein the peripheral device is configured to serve as a smart key of a vehicle where the personal navigation device is installed.

8. The personal navigation device of claim 1, wherein the peripheral device is configured to display the detailed map which depicts a navigation instruction from a parking lot located within the predetermined area to the destination.

9. The personal navigation device of claim 1, wherein the peripheral device is an E-paper or a flexible E-paper.

10. A navigation method which provides a portable electronic map, comprising:
providing a navigation instruction on a navigation console of a personal navigation device according to coordinates of a start point and a destination;
after entering a predetermined area around the destination, downloading a detailed map related to the predetermined area to a peripheral device of the personal navigation device which is connected to the navigation console in a detachable manner;
after arriving at a predetermined location in the predetermined area, providing the peripheral device as the portable electronic map by removing the peripheral device from the navigation console;
determining whether the peripheral device is attached to the navigation console; and
disabling the navigation console when detecting that the peripheral device is not attached to the navigation console.

11. The navigation method of claim 10, further comprising:
providing keyless operations on a vehicle where the personal navigation device is installed using the peripheral device.

12. The navigation method of claim 10, further comprising:
determining whether the peripheral device corresponds to the navigation console after detecting that the peripheral device is attached to the navigation console; and
enabling the navigation console after detecting that the peripheral device corresponds to the navigation console.

* * * * *